United States Patent
Griesmer et al.

(10) Patent No.: US 10,520,613 B2
(45) Date of Patent: Dec. 31, 2019

(54) HISTOGRAM SMOOTHING IN POSITRON EMISSION TOMOGRAPHY (PET) ENERGY HISTOGRAMS

(71) Applicant: KONINKLIJKE PHILIPS N.V., Eindhoven (NL)

(72) Inventors: Jerome John Griesmer, Mentor, OH (US); Thomas Leroy Laurence, North Royalton, OH (US)

(73) Assignee: KONINKLUKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/025,577

(22) PCT Filed: Oct. 14, 2014

(86) PCT No.: PCT/IB2014/065292
§ 371 (c)(1),
(2) Date: Mar. 29, 2016

(87) PCT Pub. No.: WO2015/056163
PCT Pub. Date: Apr. 23, 2015

(65) Prior Publication Data
US 2016/0223694 A1    Aug. 4, 2016

Related U.S. Application Data
(60) Provisional application No. 61/890,478, filed on Oct. 14, 2013.

(51) Int. Cl.
*G01T 1/00* (2006.01)
*G01T 1/29* (2006.01)
*G01T 1/164* (2006.01)

(52) U.S. Cl.
CPC .......... *G01T 1/2985* (2013.01); *G01T 1/1647* (2013.01)

(58) Field of Classification Search
None
See application file for complete search history.

(56) References Cited

U.S. PATENT DOCUMENTS

| | | | |
|---|---|---|---|
| 4,899,054 A * | 2/1990 | Barfod | G01T 1/1642 250/363.07 |
| 6,295,508 B1 * | 9/2001 | Trammell | H03H 11/04 250/363.09 |

(Continued)

FOREIGN PATENT DOCUMENTS

| | | | |
|---|---|---|---|
| EP | 0747730 | 12/1996 | |
| EP | 0747730 A2 * | 12/1996 | G01T 1/1642 |

(Continued)

OTHER PUBLICATIONS

Keereman, et al., "Temperature dependence of APD-based PET scanners", Medical Physics, vol. 40, No. 9, 2013.

*Primary Examiner* — David P Porta
*Assistant Examiner* — Mamadou Faye

(57) ABSTRACT

A medical nuclear imaging system (10) and method (100) generate smooth energy histograms. Radiation events are detected by a plurality of detectors (14), the radiation events localized to a plurality of pixels of the detectors (14). The energy levels of the detected radiation events are estimated and the estimated energy levels are scaled with scaling parameters that scale the energy centroids of the plurality of pixels to target values differing by offsets around a common target value, the target values differing with spatial location of the plurality of pixels. Target value offsets are removed from the scaled energy levels and the detected radiation events are combined into an energy histogram using the energy levels with the target value offsets removed.

17 Claims, 5 Drawing Sheets

(56) References Cited

U.S. PATENT DOCUMENTS

| | | | |
|---|---|---|---|
| 6,635,878 B2 | 10/2003 | Bertelsen | |
| 7,026,621 B2 | 4/2006 | Stonger | |
| 7,414,246 B2 * | 8/2008 | Griesmer | G01T 1/2985 |
| | | | 250/363.03 |
| 8,309,933 B1 | 11/2012 | Wang | |
| 2003/0116713 A1 | 6/2003 | Cooke | |
| 2009/0208086 A1 * | 8/2009 | Pelc | G06T 9/00 |
| | | | 382/131 |
| 2010/0230602 A1 | 9/2010 | Scheins | |
| 2012/0081566 A1 * | 4/2012 | Cote | H04N 5/2256 |
| | | | 348/222.1 |
| 2012/0104260 A1 | 5/2012 | Balakrishnan | |
| 2012/0228484 A1 * | 9/2012 | Burr | G01T 1/248 |
| | | | 250/252.1 |
| 2013/0142409 A1 * | 6/2013 | Chinn | A61B 6/5205 |
| | | | 382/131 |
| 2014/0231655 A1 * | 8/2014 | Dueppenbecker | G01T 1/2985 |
| | | | 250/366 |

FOREIGN PATENT DOCUMENTS

| | | |
|---|---|---|
| EP | 2051107 | 4/2009 |
| WO | 9823973 | 6/1998 |
| WO | 2007/079461 | 7/2007 |
| WO | 2008/018264 | 2/2008 |

\* cited by examiner

HISTOGRAM SMOOTHING IN POSITRON EMISSION TOMOGRAPHY (PET) ENERGY HISTOGRAMS

CROSS REFERENCE TO RELATED APPLICATIONS

This application is the U.S. National Phase application under 35 U.S.C. § 371 of International Application No. PCT/1132014/065292, filed Oct. 14, 2014, published as WO 2015/056163 on Apr. 23, 2015, which claims the benefit of U.S. Patent Application No. 61/890,478 filed Oct. 14, 2013. These applications are hereby incorporated by reference herein.

The present application relates generally to nuclear imaging. It finds particular application in conjunction with the display of positron emission tomography (PET) energy histograms, and will be described with particular reference thereto. However, it is to be understood that it also finds application in other usage scenarios, such as single-photon emission computed tomography (SPECT) or computed tomography (CT), and is not necessarily limited to the aforementioned application.

PET imaging systems generate images of regions of interest (ROIs) through the detection and localization of gamma photons that occur on positron-electron annihilation events within the ROIs. In such systems, image intensity is based on gamma photon counts, which are directly related to the concentration of injected radiopharmaceuticals or radionuclides within the ROIs. Using radiopharmaceuticals that preferentially bind to tumor cells, PET imaging systems can advantageously be used to identify tumors.

A typical PET photon detection system comprises a one-to-many coupling between photomultiplier tubes (PMTs) and scintillation crystals. The scintillation crystals convert the energy carried by an annihilation photon into light, and the PMTs convert this light into electrical signals that permit localization of this event by Anger logic. More recently, solid state detectors, such as silicon photomultipliers (SiPMs), have started replacing PMTs within PET photon detection systems. PET photon detection systems employing solid state detectors typically comprise a one-to-one coupling between the sensors of the solid state detectors and scintillation crystals. The scintillation crystals convert the energy carried by an annihilation event gamma photon into light, and the sensors count the visible light low energy photons (LEP) detected per gamma photon within the crystals.

To ensure proper imaging, PET scanners require a calibration process to carefully align all crystal energy centroids to the same target value (e.g., 511 kiloelectron-volts (keV)). Energy to light output efficiency of the scintillation crystals can vary such that some crystals produce more light in response to the same gamma photon than others. Further, the detection efficiency of light sensors can vary. The calibration process typically includes subjecting the sensors to a phantom which irradiates each sensor with gamma photons of a known energy. After a statistically meaningful number of scintillation events (e.g., 10 million), crystal-specific histograms of the output energy take the form of Gaussians centered at the known energy. For each crystal, the energy level at the center of the corresponding histogram is scaled (i.e., gain adjusted) to a common target value (e.g., 1024 counts, which represents the known energy of the gamma photons of the phantom).

With PET scanners based on photomultiplier tubes (PMTs), the amount of adjustment to the centroids of the per crystal histograms varies smoothly, since the correction for each crystal varies based on the location of the crystal relative to the spatial center of the corresponding PMT. In contrast, with solid state detectors having sensors coupled one-to-one with scintillators, the amount of adjustment to align with the target value is fairly consistent between crystals. That is to say, the amount of adjustment needed for individual crystals does not vary much.

Due to this consistency when scaling the digital counts of solid state detectors, a composite energy histogram (e.g., describing an overall PET imaging system) results in an integer Moiré pattern (i.e., a spikey energy histogram). Namely, when the centroid of a crystal is scaled up during calibration, there are bins of equal counts and then some bins that have no counts. Conversely, when the centroid of a crystal is scaled down, there are bins of equal counts and then some bins that have double counts. This has the effect of creating an integer Moiré pattern. Because the amount of alignment of crystals is fairly consistent between crystals, the integer Moiré patterns between crystals are also fairly consistent, thereby resulting in composite energy histograms that further exhibit integer Moiré pattern. In contrast to PET systems employing PMTs, there is no or minimal smoothing of the individual integer Moiré patterns when creating composite energy histograms.

FIG. 1 illustrates an energy histogram provided to a PET photon detection system of solid state detectors (i.e., the rightmost curve) and a detected energy histogram (i.e., the leftmost curve). The provided energy histogram illustrates a count (i.e., energy) distribution over 10 million events centered around 1024 light photon counts. The detected energy histogram illustrates a count distribution over about 10 million detected events centered at about 870 light photon counts. Using a digital correction/targeting method on the detected energy histogram to correct for energy to light output efficiency and detection efficiency produces the first step spikey histogram in the fine bin space illustrated in FIG. 2. After an eight-to-one rebinning of the corrected energy histogram, illustrated in FIG. 3, this integer Moiré pattern compressed into the spikey histogram.

The present application provides a new and improved system and method which overcome these problems and others.

In accordance with one aspect, a nuclear medical imaging system is provided. The system includes a plurality of detectors which detect radiation events, the radiation events localized to a plurality of pixels of the detectors. The system further includes one or more acquisition modules which estimate the energy levels of the detected radiation events and one or more first-stage energy correction modules which scale the estimated energy levels with scaling parameters that scale the energy centroids of the plurality of pixels to target values differing by offsets around a common target value, the target values differing with spatial location of the plurality of pixels. Even more, the system includes a second-stage energy correction module which removes target value offsets from the scaled energy levels and an energy histogram module which combines the detected radiation events into an energy histogram using the energy levels from the second-stage energy correction module.

In accordance with another aspect a nuclear medical imaging method is provided. Radiation events are detected by a plurality of detectors, the radiation events localized to a plurality of pixels of the detectors. The energy levels of the detected radiation events are estimated. The estimated energy levels are scaled with scaling parameters that scale the energy centroids of the plurality of pixels to target values differing by offsets around a common target value, the target values differing with spatial location of the plurality of pixels. Target value offsets are removed from the scaled energy levels. The detected radiation events are combined into an energy histogram using the energy levels with the target value offsets removed.

In accordance with another aspect, a nuclear medical imaging system is provided. The system includes a plurality of detectors which detect radiation events, the radiation events localized to a plurality of pixels of the detectors. The system further includes at least one processor configured to estimate the energy levels of the detected radiation events and scale the estimated energy levels with scaling parameters that scale the energy centroids of the plurality of pixels to target values differing by offsets around a common target value, the target values differing with spatial location of the plurality of pixels. The at least one processor is further configured to remove target value offsets from the scaled energy levels and combine the detected radiation events into an energy histogram using the energy levels with the target value offsets removed.

One advantage resides in smooth energy histograms for nuclear imaging systems employing solid state detectors with a one-to-one coupling between light sensors and scintillators.

Another advantage resides in simplified integration with existing data processing pipelines.

Another advantage resides in integration with existing data processing pipelines without a processing penalty.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 2:
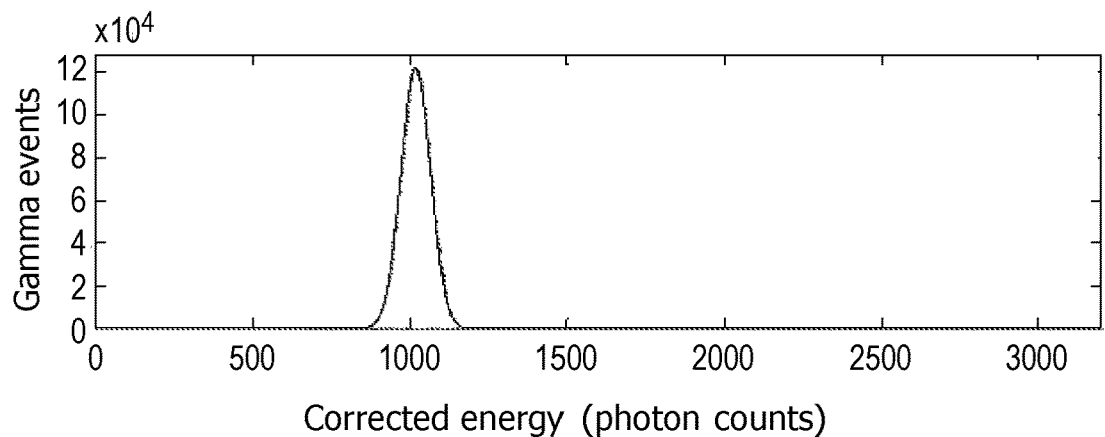
FIG. 2 illustrates a detected energy histogram after correction for energy to light output efficiency and detection efficiency (i.e., the rightmost curve).
Figure 3:
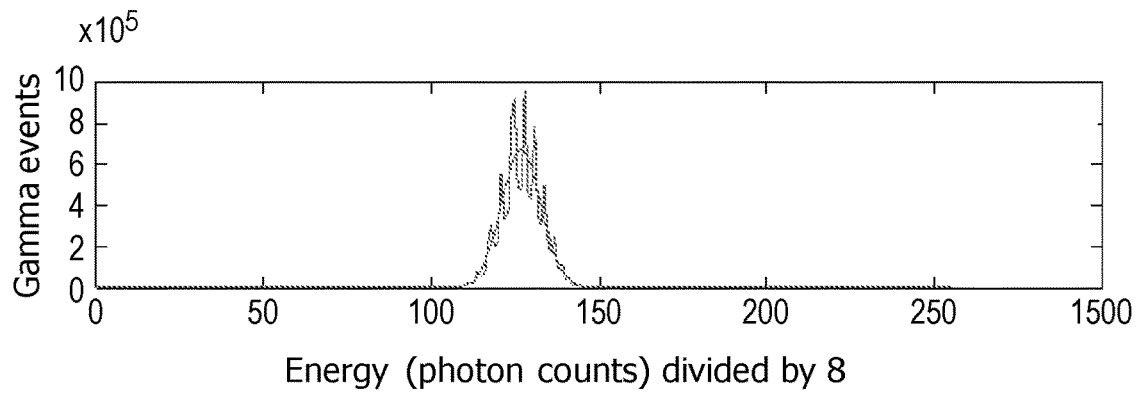
FIG. 3 illustrates the corrected energy histogram of FIG. 1 after an eight-to-one rebinning.
Figure 4:
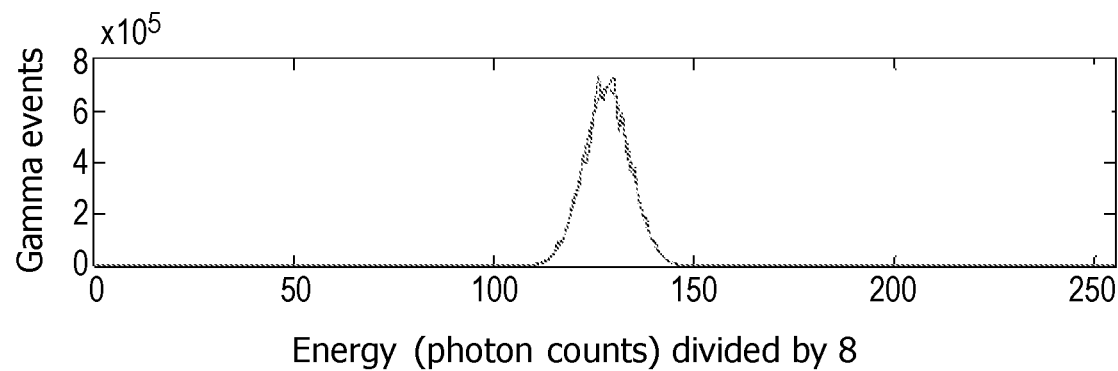
FIG. 4 illustrates the corrected energy histogram of FIG. 2 after application of dithering and after an eight-to-one rebinning.

Spikey energy histograms exhibiting integer Moiré patterns can be problematic when quality control reports incorporating nice looking (i.e., smooth) energy histograms are desired. Hence, a method of smoothing the energy histograms is needed. Such methods include distance weighted binning and forms of dithering in which dithering is added before or after energy correction. For example, FIG. 4 illustrates the corrected energy histogram of FIG. 2 after application of dithering and after an eight-to-one rebinning. As can be seen, the spikiness caused by the integer Moiré pattern is not as extreme as it was without dithering. However, these previously mentioned methods require additional processing capabilities in the data processing pipeline.

The present application describes a method for producing smooth, composite energy histograms that do no exhibit integer Moiré patterns, or exhibit minimal integer Moiré patterns, in nuclear imaging systems, such as positron emission tomography (PET) imaging systems, employing solid state detectors with a one-to-one coupling between the light sensors and scintillation crystals. The approach integrates with existing data processing pipelines without a processing penalty and includes augmenting existing scaling parameters used for energy correction to produce a form of dither between crystals. The approach only requires a small lookup table to dither the target values (which are static) so that when the final scaling is done, the integer Moiré patterns of the crystals are different, resulting in a much smoother composite energy histogram.

Figure 5:
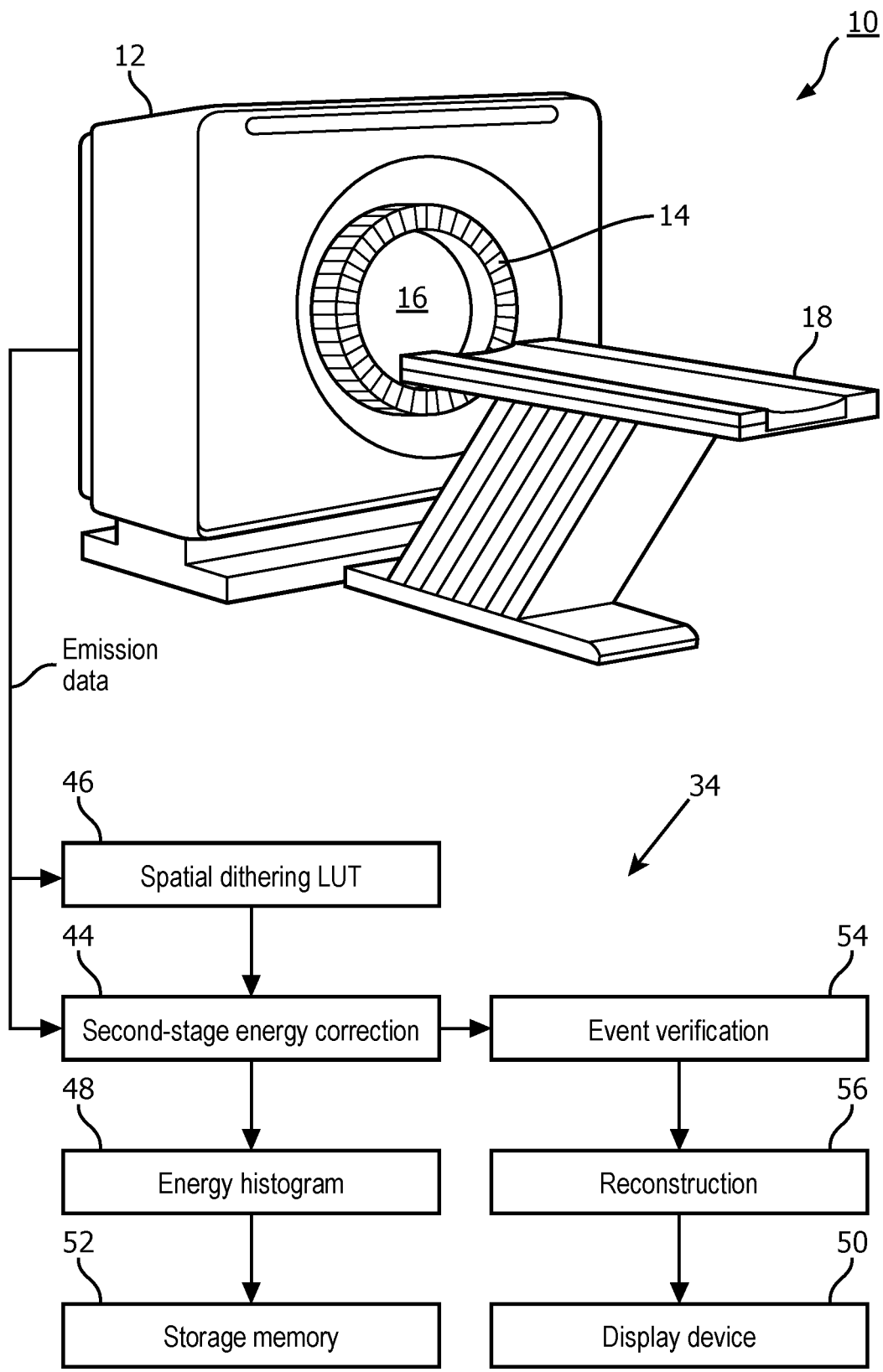
FIG. 5 illustrates a nuclear imaging system using spatial dithering of target values.

With reference to FIG. 5, a nuclear imaging system 10 is provided. As illustrated, the nuclear imaging system 10 is a PET imaging system, but other nuclear imaging systems that work on similar principals, such as single-photon emission computed tomography (SPECT) or computed tomography (CT), are contemplated. The nuclear imaging system 10 includes a nuclear scanner 12 (illustrated as a PET scanner) which generates imaging data. The scanner 12 includes solid state detectors 14 (also known as detector modules), typically formed from scintillator crystals and silicon photomultipliers (SiPMs), arranged around a bore of the scanner 12. The bore defines an examination region 16 for receiving a region of interest (ROI), such as a brain, torso, or the like, of a subject to be imaged. The detectors 14 are typically arranged in one or more stationery rings which extend a length of the examination region 16. However, rotatable heads are also contemplated. A motor and drive or the like provides longitudinal movement and vertical adjustment of a subject support 18 in the examination region 16.

Figure 6:
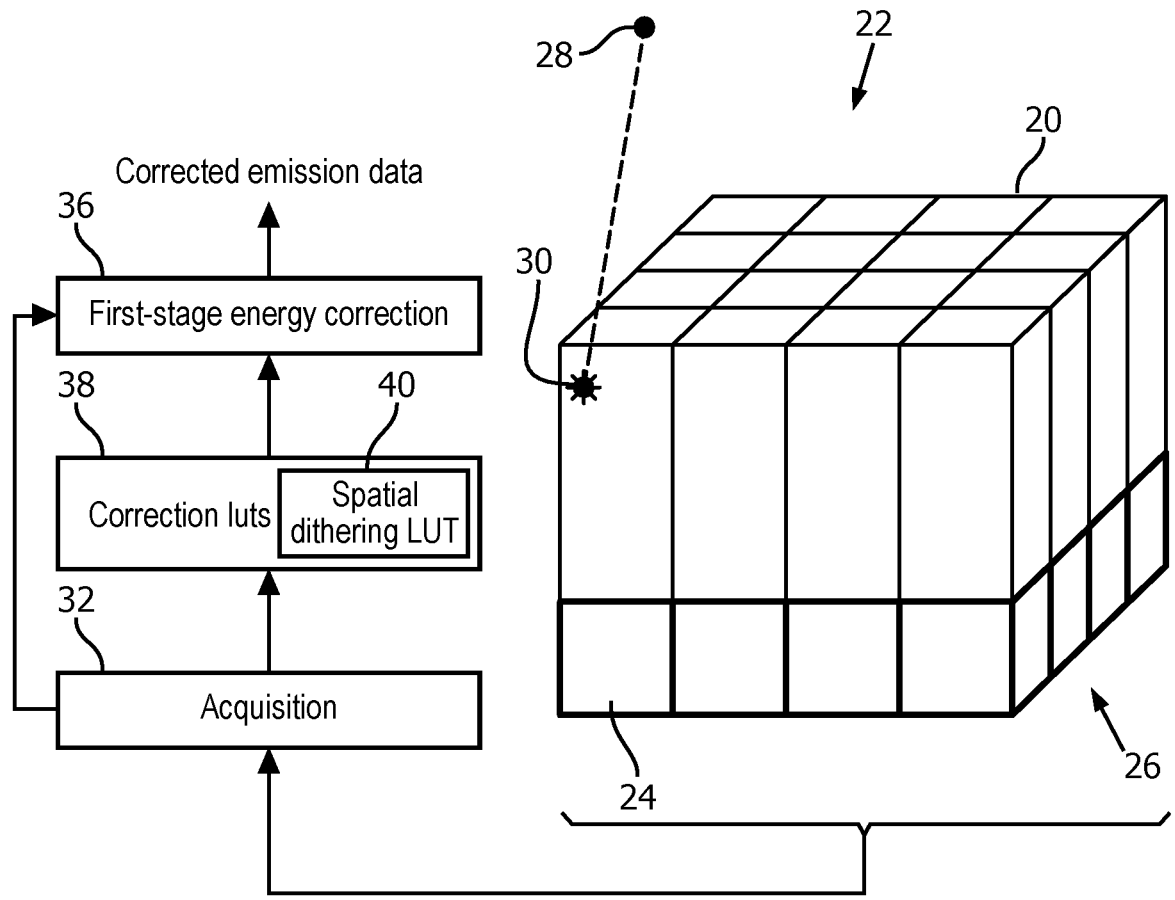
FIG. 6 illustrates the components of detectors of the nuclear imaging system of FIG. 5.

The detectors 14 detect gamma photons from the examination region 16 and generate the imaging data. As illustrated by FIG. 6, each of the detectors 14 includes one or more scintillators 20 arranged in a grid 22. Further, each of the detectors 14 includes one or more light sensors 24, each optically coupled to a corresponding scintillator 20, and arranged in a grid 26 of like size as the grid 22 of scintillators 20. There is often a one-to-one correspondence between the scintillators 20 and the sensors 24 (as illustrated), but other correspondences are contemplated. As used herein, a chip or die of a detector includes a 2×2 array of light sensors, and a tile of a detector includes an 8×8 array of light sensors (i.e., a 4×4 array of chips or dies). Examples of scintillators 20 include sodium iodide doped with thallium (NaI(Tl)), cerium-doped lutetium yttrium orthosilicate (LYSO) and cerium doped lutetium oxyorthosilicate (LSO). Examples of sensors 24 include photodiode arrays (e.g., Geiger-mode avalanche photodiode arrays) and pixels (i.e., photodiode arrays) of digital or analog SiPMs.

The scanner 12 can be used for a number of tasks, including calibration of the detectors 14, generation of energy histograms to verify the calibration of the detectors 14, or imaging of a ROI. As to calibration and verification of the detectors 14, a phantom is placed within the isocenter of the examination region 16, the phantom emitting gamma photons towards the detectors 14. As to imaging, the ROI of a subject is injected with a radiopharmaceutical or radionuclide and positioned within the examination region 16. For PET imaging, the radionuclide or radiopharmaceutical emits positrons, and for SPECT imaging the radionuclide or radiopharmaceutical emits gamma photons. As to the former, the positrons from the injected radionuclide or radiopharmaceutical annihilate electrons in the examination region 16 to create a pair of annihilation gamma photons, each traveling in approximately opposite directions.

During use of the scanner 12 (e.g., during calibration, generation of energy histograms for calibration verification or imaging), the scintillators 20 receive gamma photons from the examination region 16. As the gamma photons deposit energy in the scintillators 20, the scintillators 20 scintillate and emit light photons towards the sensors 24. The amount of light created by a scintillation event is directly correlated to the amount of energy deposited. The sensors 24 detect the light emitted by the scintillations 20 and generate data describing the amount of detected light (i.e., the energy of the detected gamma photons). With solid state detectors, the generated data is a count of light photons. As illustrated, the scintillators 20 receive a gamma photon 28, which deposits its energy in one of the scintillators 20, thereby creating a light pulse 30, which causes the detectors 14 to generate a count of light photons.

With continued reference to FIG. 6, the nuclear imaging system 10 includes one or more acquisition modules 32. As illustrated, these one or more acquisition modules 32 are typically included within the scanner 12 (i.e., the frontend). For example, each of the detectors 14 can include one or more acquisition modules 32, such as an acquisition module 32 for each sensor 24 or a common acquisition module 32 for all the sensors 24 of the detector 14. As another example, a plurality of detectors can share a common acquisition module 32. The one or more acquisition modules 32 can be integrated with the detectors 14 or external to the detectors 14. For example, where the detectors 14 include digital SiPMs made of avalanche photodiode arrays, the acquisition modules 32 can be integrated with the digital SiPMs. Notwithstanding the illustrated embodiment, it should also be appreciated that the data acquisition modules 32 can be external to the scanner 12 in a backend system 34 of the nuclear imaging system 10 (shown in FIG. 5).

The one or more acquisition modules 32 of the nuclear imaging system 10 process signals from the sensors 24 to determine the time, location and energy of each scintillation event detected by the sensors 24. Where the sensors 24 are arrays of photodiodes, the time of a scintillation event is captured from a clock, the location of the event corresponds to the known location of the detecting sensor, and the energy of the event corresponds to a count of light photons detected (i.e., counted) during the scintillation event caused by a gamma photon.

The nuclear imaging system 10 further includes one or more first-stage energy correction modules 36 downstream from the one or more acquisition modules 32 of the nuclear imaging system 10. As illustrated, these one or more first-stage energy correction modules 36 are included within the scanner 12. For example, each of the detectors 14 can include one or more first-stage energy correction modules 36, such as an energy correction module 36 for each tile of the detectors 14. As another example, the detectors 14 can share a common first-stage energy correction module 36. The one or more first-stage energy correction modules 36 of the scanner 12 can be integrated with the detectors 14 or external to the detectors 14. For example, where the detectors 14 include digital SiPMs, each digital SiPM can include a first-stage energy correction module 36. Notwithstanding the illustrated embodiment, it should be appreciated that the first-stage energy correction modules 36 can be external to the scanner 12 in the backend system 34 of the nuclear imaging system 10.

The energy count or output of the detectors 14 can vary due to variations in the energy to light conversion efficiency of the scintillators 20 and variations in the detection efficiency of the sensors 24. The detection efficiency of the sensors 24 is affected by multiple factors. These factors include saturation and manufacturing defects. Saturation occurs when a sensor 24 becomes saturated with energy of a scintillation event, such that it cannot detect any more energy of the scintillation event. For example, saturation of a pixel of a SiPM occurs when the cells (i.e., photodiodes) are struck with light photons faster than they can detect the light photons. Manufacturing defects are especially common with arrays of photodiodes. To increase yields, a certain number of defective cells (i.e., photodiodes) are tolerated and simply deactivated.

During imaging or generation of energy histograms for verification of the calibration of the scanner 12, the first-stage energy correction modules 36 receive the data acquired by the acquisition modules 32, which describes the time, location and energy (i.e., counts) of each scintillation event detected by the sensors 24. Using the received data, the first-stage energy correction modules 36 correct the data for the abovenoted variations in the energy to light conversion efficiency of the scintillators 20 and variations in the detection efficiency of the sensors 24. This includes scaling the energies of the individual scintillation events by sensor-specific scaling factors or parameters corresponding to the individual scintillation events, where these sensor-specific scaling factors scale the energy centroids of the sensors 24 to target values. The corresponding sensor-specific scaling factor of an individual scintillation event is the scaling factor of the sensor 24 that detected the event.

As noted above, when the centroid of crystal is scaled up, there are bins of equal counts and then some bins that have no counts. Conversely, when the centroid of a crystal is scaled down, there are bins of equal counts and then some bins that have double counts. This has the effect of creating an integer Moiré pattern. Since the amount of adjustment needed for individual crystals is fairly consistent when using solid state detectors with a one-to-one mapping between light sensors and scintillators, composite histograms also exhibit integer Moiré patterns.

To reduce or eliminate the integer Moiré patterns of composite histograms, the target values of the sensor-specific scaling factors differ by offsets around a common target value with spatial location of the sensors 24. For example, the scaling factor for a first sensor is generated using a target value offset from the common target value by a first amount and the scaling factor for a second sensor is generated using a target offset from the common target value by a second amount different than the first amount. In some instance, 16 different offsets, corresponding to 16 different locations of a 4×4 array of pixels, are employed. The pixels of the detectors 14 can then be grouped into 4×4 arrays and the locations of the pixels of the detectors 14 relative to their 4×4 array are used to lookup the corresponding target value offsets.

While not necessary, correction lookup tables (LUTs) 38 are suitably used for correction. In such instances, the scaling factors are integrated with the correction LUTs 38. A correction LUT 38 provides a listing of corrected energy (i.e., counts) indexed by uncorrected energy (i.e., counts) for a specific pixel. A pixel is the smallest area of the detectors 14 to which a scintillation event can be localized (e.g., a scintillator/SiPM pair). Upon receiving an uncorrected energy level describing a scintillation event, the specific correction LUT 38 of the pixel which detected the scintillation event is determined. Thereafter, the uncorrected energy level is looked up to determine the corrected energy level. A correction LUT 38 can be generated by enumerating the range of uncorrected energy levels, scaling each uncorrected energy level by the corresponding scaling factor (which aligns the centroid of the pixel to a target value), and combining the uncorrected and corrected levels into the correction LUT 38.

In the interest of reducing the size of the correction LUTs 38, the correction LUTs 38 can use compressed representations of energy. For example, supposing energy of a scintillation event is represented by a 13-bit integer, the correction LUT can use 10-bit integers. During a lookup, the 3 least significant bits of the binary representation of the uncorrected energy are dropped. This compressed energy representation is then used for the lookup. Thereafter, the corrected energy can be uncompressed by appending three zero bits to the end of the binary representation.

As noted above, sensor-specific scaling factors differ by offsets around a common target value with spatial location of the sensors 24. Hence, whereas the target value offsets are practically integrated into the correction LUTs 38, the correction LUTs 38 conceptually include a spatial dithering LUT containing the different target value offsets indexed based on pixel location. For example, the spatial dithering LUT 40 can include 16 different target value offsets, corresponding to 16 different locations of a 4×4 array of pixels. To determine a target value offset for a pixel of a 4×4 array, the location of the pixel relative to the array is used to lookup the target value offset in the spatial dithering LUT 40.

The sensor-specific scaling factors are determined before imaging or generation of histograms for calibration verification during calibration of the scanner 12. Calibration includes determining how to map, or otherwise augment, uncorrected energies to corrected energies. While the specific approach to calibration is not important, it typically includes, for each pixel of the detectors 14, determining the shift or scaling factor needed to align the centroid of the energy histogram of the pixel to the specific target value of the pixel. As noted above, the target values of the pixels of the detectors vary around a common target value by target value offsets (e.g., in the spatial dithering LUT 40).

An energy histogram of a pixel can be determined by, for example, placing a calibration phantom, such as a uniform point source, emitting gamma photons at the isocenter of the examination region 16. Thereafter, the sensors 24 are monitored and the energy histograms of each pixel of the detectors 14 is generated from a statistically meaningful number of scintillation events (e.g., 10 million). For each pixel, the shift, gain or scaling factor to shift the center of the histogram centroid from the actual energy level to a nominal energy (i.e., target value) is determined. The nominal energy level can be determined using a lookup table, such as the spatial dithering LUT 40.

Figure 1:
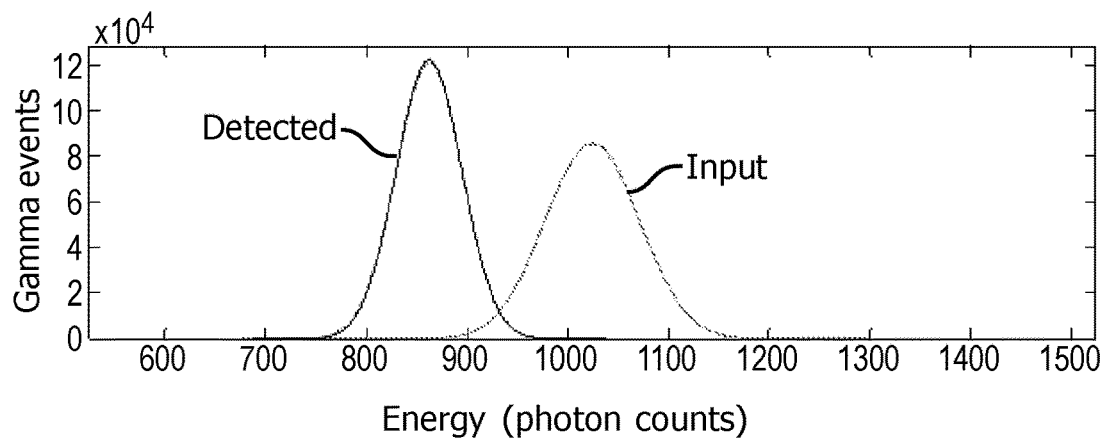
FIG. 1 illustrates an energy histogram provided to a PET photon detection system of solid state detectors (i.e., the rightmost curve) and a detected energy histogram for a crystal (i.e., the leftmost curve).

Referring back to FIG. 1, the backend system 34 generates and/or displays energy histograms, for example, describing the overall nuclear imaging system 10, individual pixels, individual detectors, individual tiles, or any other area of the detectors 14 for which events can be localized. These energy histograms are suitably employed for verification of calibration of the scanner 12. If the scanner 12 is properly calibrated, the energy centroids of the individual pixels should align. The backend system 34 can further generate nuclear images of ROIs using the scanner 12.

During imaging or generation of energy histograms for calibration verification, a source of gamma photons is placed within the examination volume 16. For the generation of histograms, the source is a phantom placed at the isocenter of the examination region 16. For imaging, the source is a ROI injected with a radiopharmaceutical or radionuclide. The subject support 18 can, for example, be employed to position the phantom or ROI within the examination volume 16.

After positioning the ROI within the examination region 16, the scanner 12 is controlled to perform a scan of the ROI and corrected emission data is acquired from the first-stage energy correction modules 36. The corrected emission data describes the time, location and energy of each scintillation event detected by the detectors 14 and has undergone a first round of energy correction by the first-stage energy correction modules 36. Subsequent to acquisition, or concurrently therewith, the acquired emission data undergoes a second round of energy correction by a second-stage energy correction module 44. While the second-stage energy correction module 44 can perform any number of energy corrections, the second-stage energy correction module 44 at the very least corrects the gain of the received data to remove the spatial dithering of the first round of energy correction. This includes, for each scintillation event in the received data, looking up the target value offset in a spatial dithering LUT 46 for the pixel that detected the scintillation event. This spatial dithering LUT 46 can be the same as the previously described spatial dithering LUT 40 or a copy of the previously described spatial dithering LUT 40. After the lookup, the target value offset is negated in the energy of the scintillation event. For example, if the target value offset was +10 photon counts, then 10 photon counts can be subtracted from the energy of the scintillation event.

Figure 7:
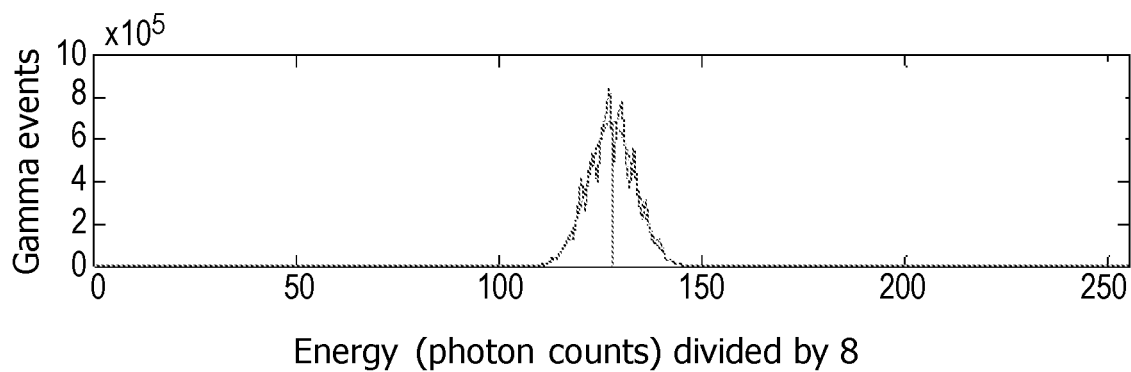
FIG. 7 illustrates the energy histogram of an individual pixel after application of spatial dithering.
Figure 8:
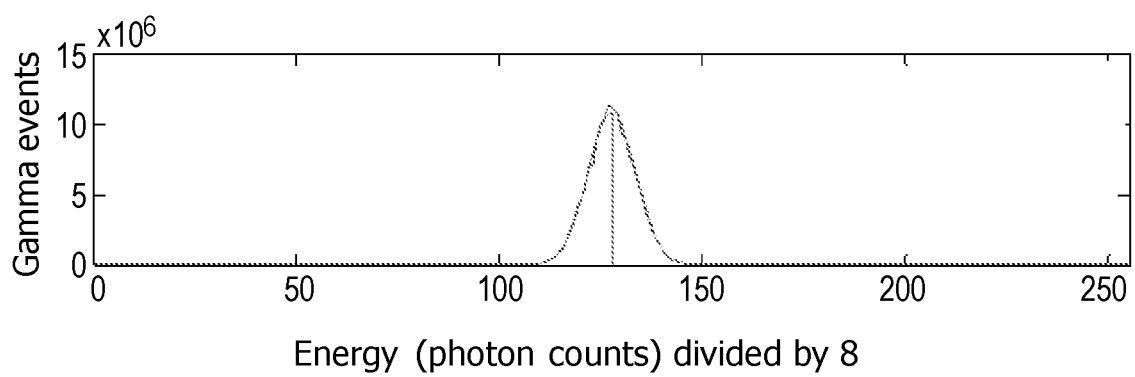
FIG. 8 illustrates a composite energy histogram generated from the energy histograms of 16 individual pixels after application of spatial dithering.

To generate energy histograms, an energy histogram module 48 receives the corrected emission data from the second-stage energy correction module 44 and generates energy histograms from the corrected emission data. The energy histograms can be generated for individual sensors 24, pixels, or detectors 14, groupings of sensors, pixels or detectors, the entire nuclear imaging system 10, or any other localized group of scintillation event counts. By using the spatial dithering with the two-stage energy correction described above, the integer Moiré patterns of the individual pixels are guaranteed to differ slightly. Hence, when combining the energy histograms of individual pixels, the energy histograms average out to a smoother composite energy histogram exhibiting minimal integer Moiré patterns. This can be seen with reference to FIGS. 7 & 8. FIG. 7 illustrates the energy histogram of an individual pixel, and FIG. 8 illustrates a composite energy histogram generated from the energy histograms of 16 individual pixels. Suitably, the generated energy histograms are displayed on a display device, such as a display device 50, and/or stored in a storage memory (as illustrated), such as storage memory 52.

To generate an image of a ROI, an event verification module 54 receives the corrected emission data from the second-stage energy correction module 44. Using the corrected emission data, the event verification module 54 filters the corrected emission data and, for PET imaging, generates lines of response (LORs). The filtering includes comparing energy of each scintillation event to an energy window, which defines the acceptable energy range for scintillation events. Those scintillation events falling outside the energy window are filtered out. Typically, the energy window is centered on the known energy of the gamma photons to be received from the examination region 16 and determined using the full width half max (FWHM) of an energy spectrum generated from a calibration phantom. LORs are determined by identifying coincident events from the remaining scintillation events. A coincident event corresponds to the detection of a pair of gammas within a specified time difference of each other, the specified time difference small enough to ensure the gammas are from the same annihilation event.

A reconstruction module 56 reconstructs the filtered scintillation events or the LORs, depending upon the imaging type, into a nuclear image of the ROI. Any number of well-known algorithms for reconstructing the LORs into PET images is contemplated. Similarly, any number of well-known algorithms for reconstructing the filtered scintillation events into SPECT images is contemplated. The nuclear images are suitably stored on a memory, such as the storage memory 52, and/or displayed on a display device (as illustrated), such as the display device 50.

Each of the acquisition, the first-stage energy correction, the second-staging energy correction, the event verification, the energy histogram and the reconstruction modules 32, 36, 44, 48, 54, 56 of the nuclear imaging system 10 can be processors programmed to perform the respective functionality, circuitry independent of processors, or a combination of the two. For example, the acquisition modules 32 can each be a combination of a controller, an accumulator circuit, a time-to-digital converter (TDC), and a TDC trigger circuit. As another example, the first-stage energy correction modules 36 can each be a field-programmable gate array (FPGA). The correction LUTs 38 and the spatial dithering LUTs 42, 46 are suitably memories storing the respective data.

Figure 9:
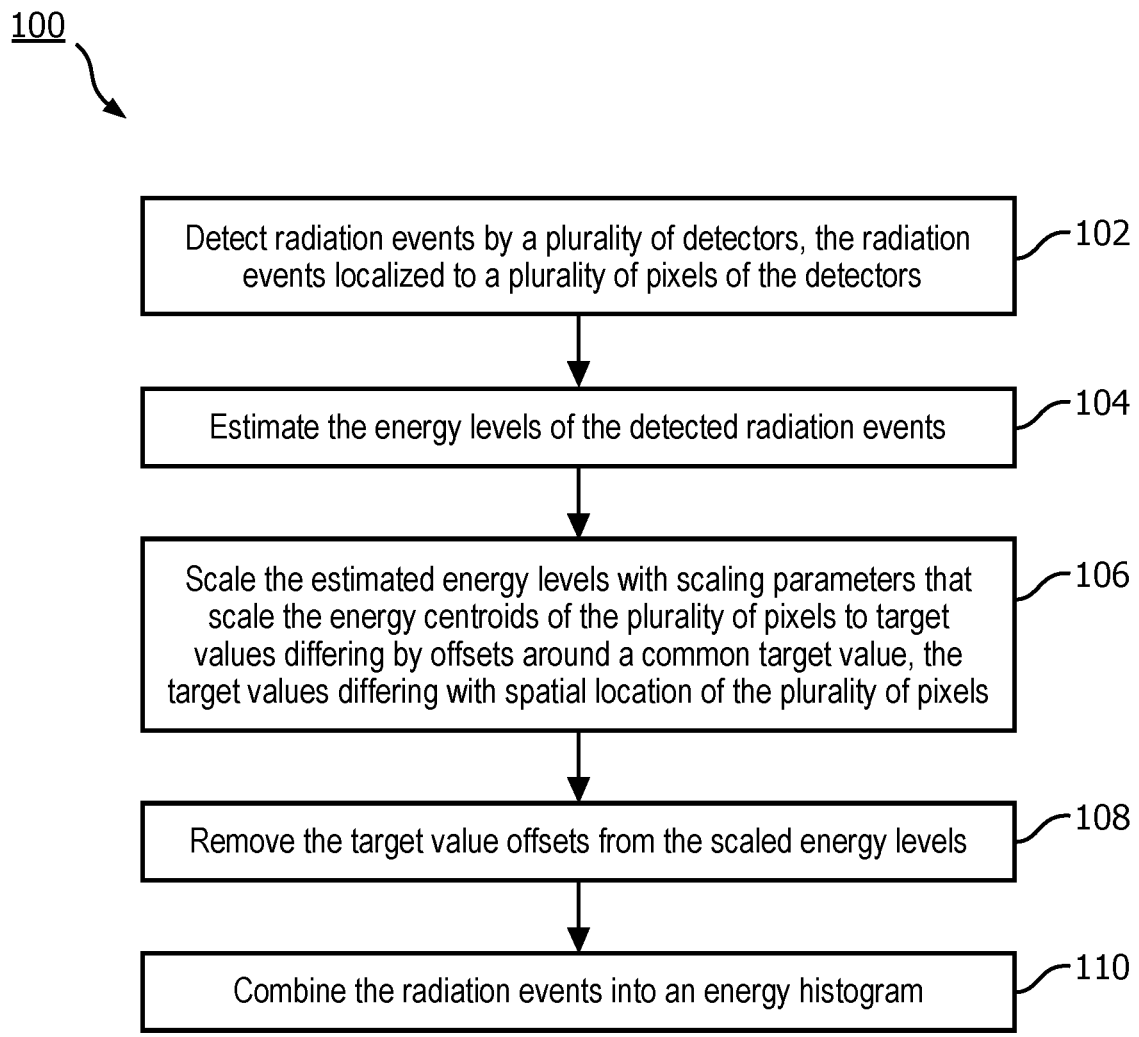
FIG. 9 illustrates an approach to energy histogram smoothing using spatial dithering.

With reference to FIG. 9, a block diagram 100 illustrates the above described approach to energy histogram smoothing, described above. The approach is allows the generation of high quality composite energy histograms that exhibit minimal integer Moiré patterns. Further, the approach finds particular application in conjunction with solid state detectors, such as digital SiPMs, and can be used with any two-stage energy correction pipeline. As described above, the first stage was performed in the frontend and the second stage was performed in the backend.

According to the approach, a plurality of detectors 14 detects radiation events 102 localized to a plurality of pixels of the detectors 14 (e.g., all of the pixels of the detectors 14). These radiation events include, for example, the depositions of energy by gamma photons in scintillators 20 of the detectors 14, which cause scintillation events that are detected by sensors 24 of the detectors 14. The gamma photons suitably originate from a phantom in an examination volume 16 of a scanner 12 of a nuclear imaging system 10 around which the detectors 14 are arranged. Concurrent with, or subsequent to, the detection, the energy level of each detected radiation events is estimated 104. The specific approach to estimating the energy level varies based upon the type of detectors used to detect the radiation events. Where the detectors 14 employ PMTs, the area under an energy curve from the PMTs represents the energy of a radiation event. Where the detectors 14 employ arrays of photodiodes, photon counts represent the energy of a radiation event.

The estimated energy levels of the detected radiation events undergo a first stage of energy correction in which the energy level of each event is scaled 106 using a scaling parameter of the pixel of the detectors 14 to which the event is localized. The scaling parameter of a pixel of the detectors 14 describes the scaling needed to align the energy centroid of the pixel to a target value. The target values of the pixels of the detectors 14 differ by different offsets around a common target value (e.g., 511 keV) based on the spatial locations of the pixels. Typically, the scaling compresses the energy levels during scaling, such that bits of the binary representations of the energy levels are dropped. The first stage of energy correction is typically performed in the frontend of the nuclear imaging system 10 (i.e., within the scanner 12). Subsequent to the first stage of energy correction, a second stage of energy correction is performed on the estimated energy levels. This second round of correction includes scaling the energy levels by removing 108 the target value offsets from the energy levels. For example, where a target value offset of 10 keV was employed for the energy level of a radiation event, 10 keV would be removed from the energy level of the radiation event. The second stage of energy correction is typically performed in the backend of the nuclear imaging system 10.

After perform the two rounds of energy correction, the radiation events are combined 110 into a composite energy histogram, which can be displayed. The energy histograms of individual pixels will continue to exhibit integer Moiré patterns. However, these integer Moiré patterns will differ slightly. This is to be contrasted with prior art systems employing solid state detectors with a one-to-one coupling between light sensors and scintillators, which do not employ target value offsets based on spatial location. Hence, combining the energy histograms of multiple pixels yields a composite energy histogram that is smoother and exhibits less of an integer Moiré pattern.

As used herein, a memory includes one or more of: a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; and the like. Further, as used herein, a processor includes one or more of a microprocessor, a microcontroller, a graphic processing unit (GPU), and the like; a user input device includes one or more of a mouse, a keyboard, a touch screen display, a button, a switch, a voice recognition engine, and the like; and a display device includes one or more of a liquid crystal display (LCD) display, a light emitting diode (LED) display, a plasma display, a projection display, a touch screen display, and the like.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A nuclear medical imaging system comprising: a plurality of solid state detectors configured to detect radiation events, the radiation events localized to a plurality of pixels of the detectors, wherein the solid state detectors includes light sensors and scintillators and each pixel comprises one light sensor coupled one-to-one with one scintillator;

one or more acquisition modules configured to estimate the energy levels of the detected radiation events as counts of photons detected by the light sensors;

one or more first-stage energy correction modules configured to scale the estimated energy levels with scaling parameters that scale the energy centroids of the plurality of pixels to target values in counts differing by offsets in counts around a common target value in counts, the target values differing with spatial location of the plurality of pixels;

a second-stage energy correction module configured to remove target value offsets from the scaled energy levels; and an energy histogram module configured to combine each of the detected radiation events detected by a grouping of the plurality of pixels or by the entire plurality of pixels into a corresponding energy histogram using the energy levels from the second-stage energy correction module;

wherein the one or more first-stage energy correction modules is configured to compress the estimated energy levels by dropping bits before scaling and to uncompress the scaled energy levels by appending a plurality of zero value bits subsequent to scaling.

2. The medical nuclear imaging system according to claim 1, further including:

a display device configured to display the energy histogram.

3. The medical nuclear imaging system according to claim 1, further including:

a memory configured to store a spatial dithering table which describes target value offsets for different spatial locations of the pixels;

wherein the second-stage energy correction module is configured to remove the target value offsets from the scaled energy levels using the spatial dithering table.

4. The medical nuclear imaging system according to claim 3, further including:

a calibration module configured to generate the scaling parameters using the spatial dithering table during calibration of the plurality of detectors.

5. The medical nuclear imaging system according to claim 1, wherein the first-stage energy correction modules are configured to correct the estimated energy levels for saturation and manufacturing defects in the plurality of detectors.

6. The medical nuclear imaging system according to claim 1, wherein the medical nuclear imaging system is one of a single-photon emission computed tomography (SPECT) imaging system and a positron emission tomography (PET) imaging system.

7. The medical nuclear imaging system according to claim 1, wherein the plurality of detectors includes digital silicon photomultipliers (SiPMs).

8. The medical nuclear imaging system according to claim 1, wherein the radiation events are gamma events.

9. The medical nuclear imaging system according to claim 1, wherein the one or more first-stage energy correction modules is localized to the frontend of the medical nuclear imaging system and the second-stage energy correction module is localized to the backend of the medical nuclear imaging system.

10. A nuclear medical imaging method comprising:

detecting radiation events by a plurality of solid-state detectors, the radiation events localized to a plurality of pixels of the detectors, wherein the solid state detectors includes light sensors and scintillators and each pixel comprises one light sensor coupled one-to-one with one scintillator;

estimating the energy levels of the detected radiation events as counts of photons detected by the light sensors;

compressing the estimated energy levels by dropping bits;

scaling the estimated energy levels with scaling parameters that scale the energy centroids of the plurality of pixels to target values in counts differing by offsets in counts around a common target value in counts, the target values differing with spatial location of the plurality of pixels;

uncompressing the scaled energy levels by appending different bits subsequent to scaling that were not present during the compressing;

removing target value offsets from the scaled energy levels; and combining each of the detected radiation events detected by a grouping of the plurality of pixels or by the entire plurality of pixels into individual energy histograms using the energy levels with the target value offsets removed.

11. The medical nuclear imaging method according to claim 10, further including:

displaying the energy histogram on a display device.

12. The medical nuclear imaging method according to claim 10, further including:

storing a spatial dithering table which describes target value offsets for different spatial locations of the pixels; and removing the target value offsets from the scaled energy levels using the spatial dithering table.

13. The medical nuclear imaging method according to claim 12, further including:

generating the scaling parameters using the spatial dithering table during calibration of the plurality of detectors.

14. The medical nuclear imaging method according to claim 10, further including:

correcting the estimated energy levels for saturation and manufacturing defects in the plurality of detectors.

15. The medical nuclear imaging method according to claim 10, wherein the plurality of detectors includes digital silicon photomultipliers (SiPMs).

16. A nuclear medical imaging system, comprising:

a plurality of solid-state detectors configured to detect radiation events, the radiation events localized to a plurality of pixels of the detectors, wherein the solid state detectors includes light sensors and scintillators and each pixel comprises one light sensor coupled one-to-one with one scintillator;

at least one processor programmed to:

estimate the energy levels of the detected radiation events as counts of photons detected by the light sensors;

compress the estimated energy levels by dropping bits;

scale the estimated energy levels with scaling parameters that scale the energy centroids of the plurality of pixels to target values in counts differing by offsets in counts around a common target value in counts, the target values differing with spatial location of the plurality of pixels;

uncompress the scaled energy levels by appending new different bits;

remove target value offsets from the scaled energy levels; and generate energy histograms for each of the detected radiation events detected by a grouping of the plurality of pixels or by the entire plurality of pixels using the energy levels with the target value offsets removed.

17. The system according to claim 16, wherein the at least one processor is further programmed to:

correct the estimated energy levels for saturation and manufacturing defects in the plurality of detectors; and
remove the target value offsets from the corrected energy levels.

* * * * *